(12) United States Patent
Tai et al.

(10) Patent No.: US 12,467,859 B2
(45) Date of Patent: Nov. 11, 2025

(54) METHOD FOR CONSTRUCTING INFRARED IMAGING DATASET OF GAS LEAKAGE BASED ON COMPUTATIONAL FLUID DYNAMICS

(71) Applicant: University of Electronic Science and Technology of China, Sichuan (CN)

(72) Inventors: Huiling Tai, Sichuan (CN); Yu Zhang, Sichuan (CN); Yadong Jiang, Sichuan (CN); Wenjie Lai, Sichuan (CN); Yuanming Wu, Sichuan (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 19/215,245

(22) Filed: May 21, 2025

(65) Prior Publication Data

US 2025/0297952 A1  Sep. 25, 2025

(30) Foreign Application Priority Data

May 22, 2024 (CN) .......................... 202410639497.5

(51) Int. Cl.
  *G01N 21/35* (2014.01)
  *G01N 21/3504* (2014.01)
  *G06F 30/28* (2020.01)
  *G06F 113/08* (2020.01)

(52) U.S. Cl.
  CPC ......... *G01N 21/3504* (2013.01); *G06F 30/28* (2020.01); *G06F 2113/08* (2020.01)

(58) Field of Classification Search
  CPC .. G01N 21/3504; G06F 30/28; G06F 2113/08
  See application file for complete search history.

(56) References Cited

FOREIGN PATENT DOCUMENTS

| | | | |
|---|---|---|---|
| CN | 107590336 A | 1/2018 | |
| CN | 113723030 A | 11/2021 | |
| CN | 116415529 A | 7/2023 | |
| KR | 101778891 B1 * | 9/2017 | .............. G01W 1/06 |

* cited by examiner

*Primary Examiner* — Jamil Ahmed

(57) ABSTRACT

A method for constructing an infrared imaging dataset of gas leakage based on computational fluid dynamics includes steps of: establishing a three-dimensional physical model of a gas leakage field scene; meshing and simulating based on the computational fluid dynamics to obtain leaking gas mole fractions of each mesh under time steps, and constituting three-dimensional gas concentration data corresponding to each frame; using optical gas imaging based on a pinhole camera model, imaging the three-dimensional gas concentration data to obtain initial images, and calculating gas concentration path-lengths corresponding to pixel points in each frame of the initial images; and performing maximum-minimum value normalization and generating grayscale images, thereby constructing the infrared imaging dataset of the gas leakage. The method can not only be used in leakage classification tasks and localization tasks, but can also be used in training tasks related to the leakage concentration.

6 Claims, 3 Drawing Sheets

METHOD FOR CONSTRUCTING INFRARED IMAGING DATASET OF GAS LEAKAGE BASED ON COMPUTATIONAL FLUID DYNAMICS

CROSS REFERENCE OF RELATED APPLICATION

The present invention claims priority under 35 U.S.C. 119 (a-d) to CN 202410639497.5, filed May 22, 2024.

FIELD OF INVENTION

The present invention relates to a technical field of gas leakage detection, and more particularly to a method for constructing an infrared imaging dataset of gas leakage based on computational fluid dynamics.

DESCRIPTION OF RELATED ARTS

Gas leakage detection technology is a key technology used to monitor and identify potential hazards in industrial environments, and with the continuous development of chemical industry, the issue of production safety is becoming increasingly urgent. Hazardous gas leakage, taking oil and gas as an example, may not only lead to major safety accidents such as explosions and poisoning, but also cause long-term negative impacts on the natural environment, resulting in a large number of economic losses and casualties. Therefore, fast and effective gas leakage detection technology is crucial to ensure industrial production safety and reduce environmental pollution.

Conventionally, deep-learning-based gas leakage detection technologies have been widely applied, including using gas infrared imaging and optical flow algorithms to locate the leakage source and to measure the gas diffusion rate through video sequences, as well as measuring time-series concentration data by spectral and concentration detectors, so as to construct datasets that can be used to train neural networks for gas concentration prediction and incident classification.

On the one hand, installing a large number of sensor networks will cost a lot, which is more suitable for fixed working scenes within a certain range, making it difficult to cope with sudden gas leakage on long pipeline routes. On the other hand, although monitoring gas leakage using infrared imaging is more flexible and can quickly locate the leakage point as well as categorize the accident level, the algorithm training is short of the relevant public datasets, while it is costly and risky to build a large number of field scenes to shoot video datasets for training.

Therefore, building a simulated gas leakage scenario using computational fluid dynamics methods can reduce training costs and avoid experimental risks. However, conventional dataset obtained by the computational fluid dynamics method only takes advantages of the two-dimensional concentration data of the cross-section, which cannot reflect the complete concentration information of the spatial scene, making it difficult to adapt to the complex gas leakage scenarios, and limited to the tasks of classifying and localizing the leakage.

SUMMARY OF THE PRESENT INVENTION

To solve the problems existing in datasets obtained by conventional computational fluid dynamics methods, an object of the present invention is to provide a method for constructing an infrared imaging dataset of gas leakage based on computational fluid dynamics, which generates images embodying three-dimensional gas concentration data with higher reliability and authenticity by using optical gas imaging, and then obtains gas concentration data of pixel points of each frame of the image. The method can be used in training tasks related to leakage concentrations, which significantly reduces the cost of dataset generation.

Accordingly, in order to accomplish the above object, the present invention provides:

a method for constructing an infrared imaging dataset of gas leakage based on computational fluid dynamics, comprising steps of:

S1: in a gas leakage field scene, collecting a geometric structure of a pipeline and a leakage aperture, so as to establish a three-dimensional physical model of the gas leakage field scene;

S2: meshing the three-dimensional physical model, and determining an inlet surface, an outlet surface and a wall surface of the three-dimensional physical model;

S3: based on the computational fluid dynamics, simulating with the meshed three-dimensional physical model; setting at least one inlet velocity of the inlet surface to obtain leaking gas mole fractions of each mesh under time steps, and constituting three-dimensional gas concentration data corresponding to each frame;

wherein during simulating, constructing a component transportation equation based on components of a leaking gas and an ambient gas determined from the gas leakage field scene, and selecting a turbulence model based on the geometric structure of the pipeline and a flow rate of the leaking gas;

S4: using optical gas imaging based on a pinhole camera model, imaging the three-dimensional gas concentration data to obtain initial images, and calculating gas concentration path-lengths corresponding to pixel points in each frame of the initial images; and S5: performing maximum-minimum value normalization on the gas concentration path-lengths corresponding to all the pixel points in the initial images, and generating grayscale images according to normalization results; and constructing the infrared imaging dataset of the gas leakage based on the grayscale images and the gas concentration path-lengths corresponding to the pixel points in the grayscale images.

Preferably, in the step S2, a size of the mesh is $1/100$ to $1/1000$ of a size of the geometrical structure of the pipeline in the gas leakage field scene.

Preferably, in the step S2, the meshes are polyhedra such as tetrahedra or hexahedra.

Preferably, in the step S3, a coulomb number during simulating is kept no more than 2.

Preferably, in the step S3, the turbulence model is a standard k-& model, a RNG (Re-normalization group) k-& model, a realizable k-& model, a standard k-model, or an SST (Shear Stress Transport) k-o model.

Preferably, in the step S3, the leaking gas mole fraction for each mesh is equal to a ratio of an amount of substance of the leaking gas in the mesh to an amount of substance of all gases.

Preferably, in the step S4, during imaging, the gas concentration path-lengths corresponding to the pixel points are obtained by processing the leaking gas mole fractions of all meshes contained in each pixel point with path integrating.

Preferably, in the step S4, before imaging, the three-dimensional gas concentration data are processed with nearest-neighbor interpolation, thereby expanding data nodes and improving image quality.

Compared with the prior art, beneficial effects of the present invention are as follows:

1. The present invention provides a method for constructing an infrared imaging dataset of gas leakage based on computational fluid dynamics, which solves the problem of lacking publicly available gas leakage infrared imaging datasets. Compared with building a large number of field scenes to shoot video datasets, the present invention significantly reduces the cost of dataset construction.

2. The present invention utilizes optical gas imaging based on a pinhole camera model to image three-dimensional gas concentration data and then generate grayscale images, which shows higher reliability and authenticity compared with the dataset constructed by utilizing only the two-dimensional concentration data of the cross-section.

3. The infrared imaging dataset of gas leakage constructed by the present invention can not only be used in traditional leakage classification tasks and localization tasks, but can also be used in training tasks related to the leakage concentration by taking advantages of the gas concentration path-length of each pixel point.

DETAILED DESCRIPTION OF THE PREFERRED EMBODIMENT

In order to make the objects, technical solutions and advantages of the present invention clearer and more understandable, the present invention will be further described in conjunction with embodiment and accompanying drawings which are exemplary only and are not intended to be limiting.

Embodiment 1

Figure 1:
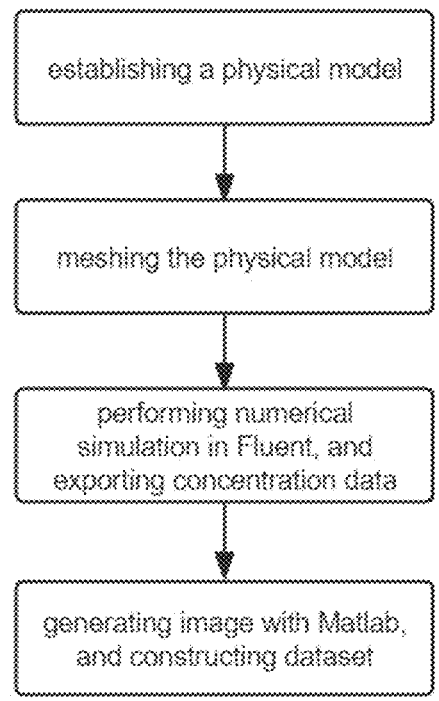
FIG. 1 is a flowchart of a method for constructing an infrared imaging dataset of gas leakage based on computational fluid dynamics according to an embodiment 1.
Figure 2:
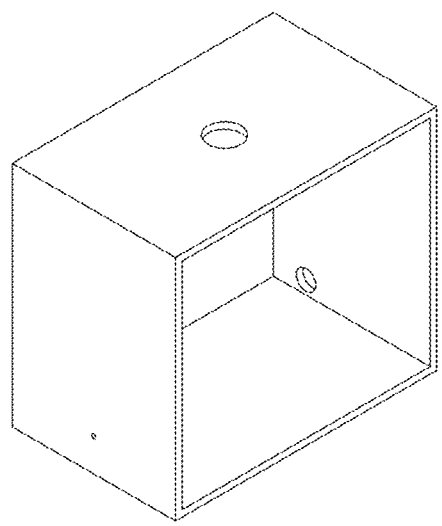
FIG. 2 is a perspective view of a three-dimensional physical model according to the embodiment 1.
Figure 3:
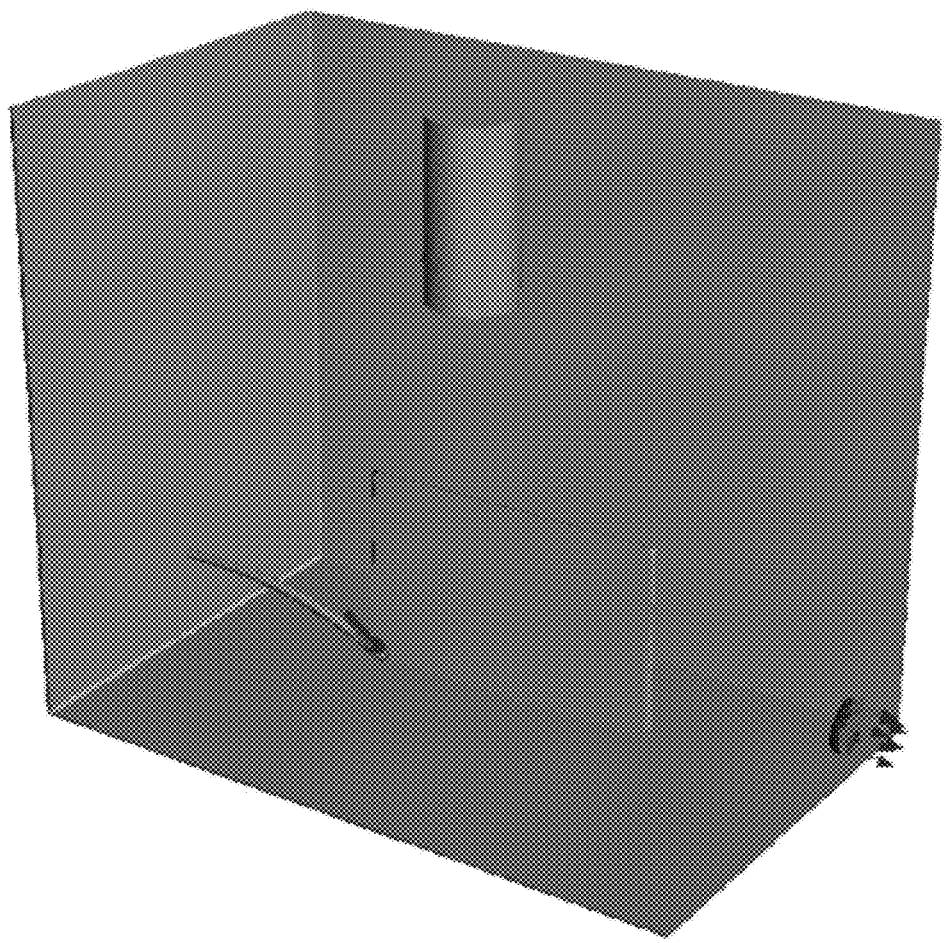
FIG. 3 illustrates the three-dimensional physical model of the embodiment 1 after being imported into Fluent.
Figure 4:
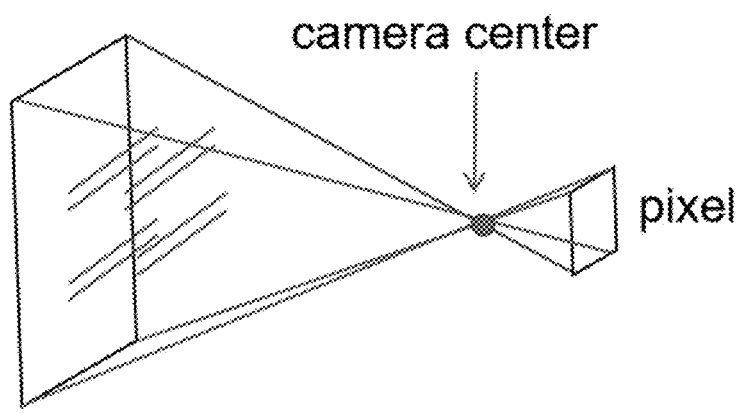
FIG. 4 is a sketch view of a pinhole camera model used in the embodiment 1.
Figure 5:
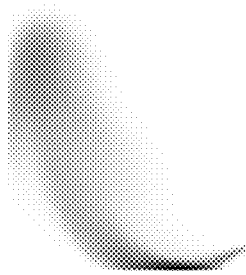
FIG. 5 is a frame of grayscale image generated in the embodiment 1.

According to embodiment 1, a method for constructing an infrared imaging dataset of gas leakage based on computational fluid dynamics is provided, which is shown in FIG. 1, comprising steps of:

S1: in a gas leakage field scene, collecting a geometric structure of a pipeline and a leakage aperture, so as to establish a three-dimensional physical model of the gas leakage field scene under an XYZ rectangular coordinate system in a geometric modeling software (e.g., Discovery), which is shown in FIG. 2, with dimensions of 0.8 m, 0.5 m and 0.7 m in X, Y and Z directions, respectively;

S2: importing the three-dimensional physical model into a meshing software (e.g., Ansys Meshing), and meshing the three-dimensional physical model; setting a maximum size of a mesh to 0.005 m, and determining an inlet surface, an outlet surface and a wall surface of the three-dimensional physical model;

S3: importing the meshed three-dimensional physical model into a computational fluid dynamics simulation software (e.g., Fluent), so as to obtain a three-dimensional physical model as shown in FIG. 3 for pre-processing, specifically:

selecting transient calculation, turning on gravity, and setting z-direction acceleration to $-9.81$ m/s$^2$; selecting an SST k-o model as a turbulence model; constructing component transport equations, and setting components of a leaking gas and an ambient gas to be methane and air, respectively; selecting incompressible gas for a density term; setting a methane inlet velocity at the inlet surface to be 2.5 m/s, a initial methane component percentage to be 1, a temperature to be 300 K, and an initial methane fraction at the outlet surface to be 0;

after the pre-processing of standard initialization, using PISO (Pressure-Implicit with Splitting of Operators) algorithm for solution calculation with a time step of 0.005 s, wherein an ASCII format is selected, and a mesh center option is used to save simulation data; setting at least one inlet velocity of the inlet surface to obtain leaking gas mole fractions of each mesh under time steps, and constituting three-dimensional gas concentration data corresponding to each frame;

S4: importing the three-dimensional gas concentration data into a mathematical software (e.g., MATLAB), wherein the simulated three-dimensional gas concentration data is of uneven sparsity, making data points more dense at edges of the three-dimensional physical model and more sparse on interior; if generated directly by using the original three-dimensional gas concentration data without interpolation, images obtained will have a large number of noisy and poor quality; therefore, it is necessary to establish an interpolation grid in three-dimensional space and use a nearest neighbor interpolation method to interpolate the concentration data in order to improve the image quality, and then obtain interpolated three-dimensional gas concentration data; wherein the established interpolation grid is consistent with spatial location of the three-dimensional physical model, and the grid division rules are: a step length of 0.004 m if $x\in[-0.8,0]$, a step length of 0.01 m if $y\in[0,0.5]$, and a step length of 0.005 m if $z\in[0,0.7]$;

S5: using optical gas imaging based on a pinhole camera model as shown in FIG. 4, imaging the three-dimensional gas concentration data to obtain initial images, and calculating gas concentration path-lengths corresponding to pixel points in each frame of the initial images;

wherein a lens position of the pinhole camera model is $(-0.4, -50, 0.35)$, a pixel point size is set to 0.005 m$\times$0.005 m; since the pixel points are very small, they can be treated as a small square grid in the imaging plane, and four edges of the square grid form four planes with the point where the lens is located, respectively; a single computational region is an area surrounded by the four planes; the leaking gas molar fractions of all the grids in the computational region are processed with path integrating, so as to obtain the gas concentration path-length corresponding to the pixel point in the unit of ppm$\times$m; each initial image consists of 224×224 pixel points; parallel computation in parfor software is selected to accelerate computation speed; and S6: performing maximum-minimum value normalization on the gas concentration path-lengths corresponding to all the pixel points in the initial images:

$$C^* = \frac{C - C_{min}}{C_{max} - C_{min}}$$

Wherein C is the gas concentration path-length corresponding to a current pixel point, $C_{min}$ is a lowest value among the gas concentration path-lengths of all pixel points, $C_{max}$ is a highest value among the gas concentration path-lengths of all pixel points, and C* is a normalization result;

referring to FIG. 5, generating grayscale images according to normalization results; and constructing the infrared imaging dataset of the gas leakage based on the grayscale images and the gas concentration path-lengths corresponding to the pixel points in the grayscale images.

Figure 6:
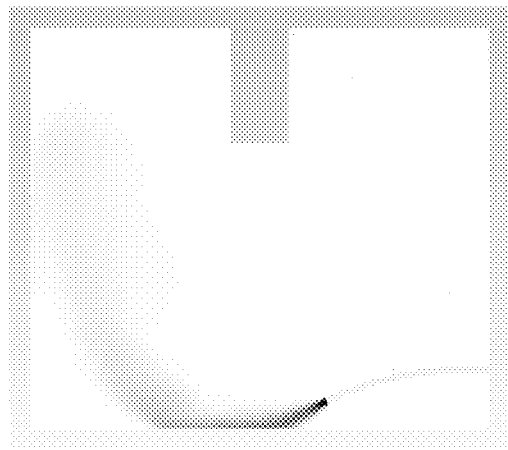
FIG. 6 is a grayscale image of two-dimensional cross-section concentration of the same frame shown in FIG. 5 of the embodiment 1.

FIG. 6 is a grayscale image of two-dimensional cross-section concentration of the same frame shown in FIG. 5, which intercepts the two-dimensional concentration data at y=0.25 m. It can be seen that FIG. 6 only reflects a part of the leaking gas situation in the gas leakage field scene. The present invention utilizes optical gas imaging based on a pinhole camera model to image three-dimensional gas concentration data and then generate grayscale images, which can cover the complete concentration information of the spatial region, and shows higher reliability and authenticity.

The infrared imaging dataset of gas leakage constructed in the embodiment 1 includes specific gas concentration path-lengths, which can be used in training tasks related to the leakage concentration.

It is to be noted that the above is only a preferred embodiment of the present invention, which is not intended to be limiting. Any modifications, equivalent substitutions and improvements made within the spirit and principles of the present invention by those skilled in the art hinted by the technical scheme disclosed herein shall be covered within the protection scope of the present invention.

What is claimed is:

1. A method for constructing an infrared imaging dataset of gas leakage based on computational fluid dynamics, comprising steps of:
   S1: in a gas leakage field scene, collecting a geometric structure of a pipeline and a leakage aperture, so as to establish a three-dimensional physical model of the gas leakage field scene;
   S2: meshing the three-dimensional physical model, and determining an inlet surface, an outlet surface and a wall surface of the three-dimensional physical model;
   S3: based on the computational fluid dynamics, simulating with the meshed three-dimensional physical model; setting at least one inlet velocity of the inlet surface to obtain leaking gas mole fractions of each mesh under time steps, and constituting three-dimensional gas concentration data corresponding to each frame;
   wherein during simulating, constructing a component transportation equation based on components of a leaking gas and an ambient gas determined from the gas leakage field scene, and selecting a turbulence model based on the geometric structure of the pipeline and a flow rate of the leaking gas;
   S4: using optical gas imaging based on a pinhole camera model, imaging the three-dimensional gas concentration data to obtain initial images, and calculating gas concentration path-lengths corresponding to pixel points in each frame of the initial images; and
   S5: performing maximum-minimum value normalization on the gas concentration path-lengths corresponding to all the pixel points in the initial images, and generating grayscale images according to normalization results; and constructing the infrared imaging dataset of the gas leakage based on the grayscale images and the gas concentration path-lengths corresponding to the pixel points in the grayscale images.

2. The method, as recited in claim 1, wherein in the step S2, a size of the mesh is 1/100 to 1/1000 of a size of the geometrical structure of the pipeline in the gas leakage field scene.

3. The method, as recited in claim 1, wherein in the step S3, a coulomb number during simulating is kept no more than 2.

4. The method, as recited in claim 1, wherein in the step S3, the turbulence model is a standard k-ε model, a RNG (Re-normalization group) k-ε model, a realizable k-ε model, a standard k-ε model, or an SST (Shear Stress Transport) k-ε model.

5. The method, as recited in claim 1, wherein in the step S4, during imaging, the gas concentration path-lengths corresponding to the pixel points are obtained by processing the leaking gas mole fractions of all meshes contained in each pixel point with path integrating.

6. The method, as recited in claim 1, wherein in the step S4, before imaging, the three-dimensional gas concentration data are processed with nearest-neighbor interpolation.

* * * * *